United States Patent [19]

Kent

[11] 4,144,223

[45] Mar. 13, 1979

[54] BLENDS OF TRANS-1,4-POLYMERS AND POLY(EPSILON-CAPROLACTONE)

[75] Inventor: Eric G. Kent, Sarnia, Canada

[73] Assignee: Polysar Limited, Sarnia, Canada

[21] Appl. No.: 841,438

[22] Filed: Oct. 12, 1977

[30] Foreign Application Priority Data

Oct. 18, 1976 [CA] Canada .................................. 263579

[51] Int. Cl.$^2$ ........................... C08K 3/36; C08L 9/00
[52] U.S. Cl. .............................. 260/42.47; 260/42.29; 260/42.32; 260/42.37; 260/42.44; 260/887; 260/890
[58] Field of Search ..................... 260/887, 890, 42.47, 260/42.37, 42.32, 42.29, 42.44

[56] References Cited

U.S. PATENT DOCUMENTS

| | | | |
|---|---|---|---|
| 3,528,936 | 9/1970 | Kent et al. ......................... | 260/42.47 |
| 3,637,544 | 1/1972 | Lundberg et al. ................... | 260/887 |
| 3,708,331 | 1/1973 | Leydon et al. ..................... | 260/42.47 |

*Primary Examiner*—J. Ziegler
*Attorney, Agent, or Firm*—Stevens, Davis, Miller & Mosher

[57] ABSTRACT

Blends of trans-1,4 polymers of $C_4$–$C_5$ conjugated diolefinic compounds and poly(epsilon-caprolactone) have improved properties and are suitable for use in medical casts or, when vulcanized, as golf ball covers.

6 Claims, No Drawings

BLENDS OF TRANS-1,4-POLYMERS AND POLY(EPSILON-CAPROLACTONE)

This invention is directed to polymeric blends having improved properties, specifically to blends of trans-1,4 polymers of $C_4$–$C_5$ conjugated diolefinic compounds with polymers of caprolactone.

One naturally occurring polymer of a trans-1,4 conjugated diolefinic compound is the polymer of isoprene known as balata or gutta percha. This polymer has enjoyed a variety of uses over the years including use in submarine cables and golf ball covers. The polymer is relatively high in cost and the supply is irregular. Because of this, it has been extensively replaced by a synthetic trans-1,4-polyisoprene which is available on a more regular supply basis and is of uniform composition, not needing the clean up and purification steps necessary with balata. Trans-1,4 polybutadiene is also available as a synthetic polymer which has generally similar characteristics to those of trans-1,4-polyisoprene. Another synthetic polymer which also possesses certain of the same characteristics is trans-1,4 polychloroprene.

A characteristic common to these polymers is that they all have a high level of crystallinity which leads to good strength properties in the polymer at normal temperatures and easy processing of the polymer at temperatures near or above the crystalline melting point. Further, these polymers are all vulcanizable, due to the presence of unsaturation alone or in combination with an active chlorine group. The raw polymer, or the raw polymer compounded with conventional compounding ingredients with the exception of vulcanization agents, may be used in a wide variety of applications where strength at ambient temperature is important. Such applications include medical casts, adhesives and moldable sheets. The vulcanized polymer may be used where hardness and a greater degree of permanence of shape is required such as in a golf ball cover.

Poly(epsilon-caprolactone) is a cyclic ester polymer which may be generally described as containing a major proportion of units of structure

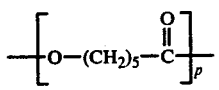

wherein p is not less than 100 and not more than about 3,000. This particular polymer is crystalline and has a relatively high strength. However, it cannot be vulcanized due to the absence of unsaturation in the polymer. Because of the low crystalline melting point (about 60° C.) it has a low upper temperature service limit. Uses proposed for this polymer include formable toy applications, casts and household repair products.

We have now discovered that blends of trans-1,4 polymers of $C_4$–$C_5$ conjugated diolefinic compounds and poly(epsilon-caprolactone) possess useful properties which would not be predictable based on the properties of the individual polymers of the blend. We have found, for example, that such blends yield improved medical casts in the nonvulcanized state and provide improved golf ball covers when vulcanized.

It is an object of this invention to provide blends having improved properties comprising a trans-1,4 polymer of $C_4$–$C_5$ conjugated diolefinic compounds and poly(epsilon-caprolactone), the proportions of the polymers in the blend being from about 98 parts to about 50 parts by weight of the trans-1,4 polymer and from about 2 to about 50 parts by weight of the poly(epsilon-caprolactone).

It is a further object of this invention to provide blends having improved properties comprising trans-1,4 polymer of $C_4$–$C_5$ conjugated diolefinic compounds and poly(epsilon-caprolactone) additionally containing from about 10 to about 30 parts by weight per 100 parts by weight of the polymeric blend of at least one fine particle size filler, the proportions of the polymers in the blends being from about 85 parts to about 60 parts by weight of the trans-1,4 polymer and from about 15 to about 40 parts by weight of the poly(epsilon-caprolactone).

It is a still further objective of this invention to provide polymeric blends suitable for use as golf ball covers comprising trans-1,4 polyisoprene and poly(epsilon-caprolactone) wherein the amount of trans-1,4 polyisoprene is from about 80 parts to about 65 parts by weight and the amount of poly(epsilon-caprolactone) is from about 20 to about 35 parts by weight, the blend having a melt flow index under a load of 10kg of about 0.75 to about 2.0g per 10 minutes.

In the blends of this invention, suitable trans-1,4 polymers of $C_4$–$C_5$ conjugated diolefinic compounds are the trans-1,4 polymers of butadiene, isoprene and chloroprene. The trans-1,4 content of these polymers is suitably at least about 75%, and preferably at least about 85%, of the unsaturation in the polymer. A preferred polymer is trans-1,4-polyisoprene which contains at least 85% trans-1,4 units and has at least 10%, preferably 20% to 40%, crystallinity at room temperature (that is about 20° to 30° C.) as measured by X-ray diffraction.

The poly(epsilon-caprolactone) used in the blends of this invention contains repeat units of the structure

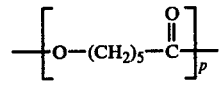

where p is at least 100 and not more than about 3,000, and has a melting point of 60° C. and a density at 20° C. of about 1.15g/cc.

The fine particle size fillers which may be used in the blends of this invention are preferably selected from silica, titanium dioxide and diatomaceous earth or mixtures thereof. The preferred silica has a particle size of about 0.25 microns or less and is normally a precipitated silica. The preferred titanium dioxide has an average particle size of about 0.3 microns and the diatomaceous earth has an average particle size between about 1 and 10 microns depending on the particular grade used. The filler may be present in the blends at a concentration of from about 10 to about 30 parts by weight per 100 parts by weight of the polymeric blend and preferably is present at 20 to 30 parts by weight. Mixtures of the fillers may also be used, especially of silica and titanium dioxide.

In the blends of this invention suitable for use as golf ball covers, the polymeric blend as hereinbefore described may be mixed with natural rubber in the proportion of polymeric blend about 80 parts by weight and natural rubber about 20 parts by weight. To this may, for example, be added about 5 to 25 parts by weight of titanium dioxide and about 2 to 10 parts by weight of zinc oxide. A suitable curing system may include about 0.5 to 1.5 parts by weight of elementary sulphur and optionally additional organo-sulphur compounds well known in the art as accelerators in amounts of about 0.1 to about 0.25 parts by weight. When formed over the core of the golf ball, such a cover may be cured, for example, by heating at about 100° F. [38° C.] for about 5 days. The art of curing golf ball covers containing trans-1,4-polyisoprene is well known in the industry.

It is surprising that the trans-1,4 polymer and the poly(epsilon-caprolactone) are compatible, that the blend is vulcanizable and that there appears to be a synergistic effect on the properties of the blends. It is especially surprising that a hydrocarbon polymer such as trans-1,4-polyisoprene should be compatible with a polar polymer such as poly(epsilon-caprolactone) and that the blend does not exhibit two separate phases, each phase having the melting point of the major component of that phase. The poly(epsilon-caprolactone) is very sticky above its melting point and cannot readily be handled at temperatures about 60° C., but when allowed to cool it hardens very rapidly and has a very short working time, eliminating any prolonged molding. On the other hand, trans-1,4-polyisoprene handles quite readily even at temperatures above about 65° C., the melting point of the crystals, and when allowed to cool hardens fairly slowly, thereby allowing a reasonable working time for molding. Additionally, the trans-1,4-polyisoprene retains its property of self adherence during the cooling stage and while it is workable, whereas the poly(epsilon-caprolactone) is not self adherent beyond its very short working time, which is a serious disadvantage in the preparation of medical casts. The blends of this invention exhibit a range of properties which permit them to be used in a wider range of end uses than is possible for either polymer in the blend or, alternatively, improves the suitability for certain end uses.

The invention is exemplified by the following examples wherein all parts are parts by weight unless otherwise specified.

EXAMPLE 1

The blends of composition shown in Table I were mixed in a Brabender mixer (Brabender is a registered Trade Mark) at 70° C. for 5 minutes, the rotor being operated at 160 rpm and the mixing chamber being kept under nitrogen. The trans-1,4-polyisoprene has a Mooney value (ML + 4 at 100° C.) of 64 and a crystallinity of about 27% when measured by an X-ray method at room temperature. The poly(epsilon-caprolactone) was too fluid at 100° C. for a Mooney measurement; the material was obtained from Union Carbide Corporation identified as PCL-700.

The properties of the blends that were measured were the Shore C Hardness, the melt flow index (ASTM-D-1238-65T at 100° C.), Mooney (ML 1 + 4 at 100° C.), stress-strain and the adherence to itself of the partially cooled blend.

Blend Nos. 1 and 5 are controls showing the properties of the trans-1,4-polyisoprene and of poly(epsilon-caprolactone).

Uses for trans-1,4-polyisoprene and for the blends of this invention require the polymer to possess a balance of various properties including flow, hardness and strength. The results in Table I show that the blends of this invention possess a suitable range of such properties depending on the composition of the blend.

TABLE I

| Blend No.: | 1 | 2 | 3 | 4 | 5 |
|---|---|---|---|---|---|
| | (Control) | | | | |
| Trans-1,4-polyisoprene | 100 | 90 | 75 | 50 | — |
| Poly(epsilon-caprolactone) | — | 10 | 25 | 50 | 100 |
| Shore C Hardness | 72 | 72 | 75 | 78 | 85 |
| M.F.1. g/10 mins. | 0.15 | 0.26 | 0.78 | 4.66 | 12.7 |
| Mooney (ML 1 + 4 at 100° C) | 64 | 40 | 20 | 10 | — |
| Self-Adherence | Yes | Yes | Yes | Yes | No |
| Tensile Strength Kg/cm$^2$ | 428 | 385 | 247 | 113 | 372 |
| 300% Modulus Kg/cm$^2$ | 216 | 223 | 183 | 95 | 139 |
| Elongation % | 495 | 450 | 379 | 320 | 770 |

The trans-1,4-polyisoprene and the blends of this invention exhibit a working time of about 4 to 5 minutes during which time the surface will readily adhere to itself when lightly contacted, whereas the poly(epsilon-caprolactone) exhibits a working time of only about 1 minute after which it does not exhibit self-adherence.

EXAMPLE 2

Blends were prepared of trans-1,4-polyisoprene, poly(epsilon-caprolactone) and fine particle silica available as Hisil 233 (Hisil is a registered Trade Mark). The amount of each component in the blends is shown in Table II. The mixing was done on a two-roll rubber mill, with the rolls maintained at about 70° C. for sufficient time to achieve good dispersion of all the components. The properties of the blends are shown in Table II, blend numbers 21, 24 and 27 being controls outside the scope of this invention.

TABLE II

| Blend No. | 21 | 22 | 23 | 24 | 25 | 26 | 27 |
|---|---|---|---|---|---|---|---|
| | (Control) | | | (Control) | | | (Control) |
| Trans-1,4 polyisoprene | 100 | 85 | 75 | — | 75 | 62.5 | — |
| Poly(epsilon-carolactone) | — | 15 | 25 | 100 | 25 | 37.5 | 100 |
| Hi Sil | 15 | 15 | 15 | 15 | 25 | 25 | 25 |
| Flexural strength Kg/cm$^2$ | 114 | 112 | 123 | 198 | 135 | 144 | 222 |
| Flexural Modulus Kg/cm$^2$ | 3050 | 2790 | 3025 | 5185 | 4000 | 4480 | 7200 |
| Hardness Shore C | 77 | 77 | 77 | 87 | 80 | 84 | 90 |

EXAMPLE 3

Blends of trans-1,4-polyisoprene and poly(epsilon-caprolactone) were prepared and then further compounded and evaluated as golf ball covers. The blends were prepared, in the ratios shown in Table III, by mill mixing at about 70° C. Portions of each blend were then compounded, in the recipe shown in Table III under Compound composition, such as to be suitable for subsequent use as golf ball covers. The melt flow index and stress-strain characteristics were determined for these compounds. Samples of these compounds, in sheet form, were immersed in a 5 wt. % solution of dibutyl xanthogen disulphide in acetone for 10 minutes, removed, surface material shaken off and stored in an air chamber for 3 days at 45° C. in order to cause vulcanization to occur. The stress-strain properties of the vulcanizates were determined. Further samples of the compounds were molded over pre-formed wound golf ball centres to produce covered golf balls which were then vulcanized by the same immersion and storage procedure as above. The golf balls so produced were found to have good resilience, excellent click and excellent cut resistance.

TABLE III

| Experiment No. | 31 | 32 | 33 |
|---|---|---|---|
| A. Polymer blend composition - parts by weight | | | |
| Trans-1,4-polyisoprene | 80 | 75 | 70 |
| Poly(epsilon-caprolactone) | 20 | 25 | 30 |
| Melt flow index g/10 minutes | 0.71 | 0.97 | 1.86 |
| B. Compound composition - parts by weight | | | |
| Polymer blend | 80 | 80 | 80 |
| Natural rubber | 20 | 20 | 20 |
| Titanium dioxide | 20 | 20 | 20 |
| Zinc oxide | 3 | 3 | 3 |
| Sulphur | 1 | 1 | 1 |
| DBA | 1 | 1 | 1 |
| Melt flow index g/10 minutes | 1.32 | 1.60 | 2.52 |
| Tensile strength Kg/cm² | 335 | 280 | 265 |
| 300% Modulus Kg/cm² | 210 | 205 | 190 |
| Elongation % | 450 | 390 | 405 |
| C. Vulcanizate properties | | | |
| Tensile strength Kg/cm² | 215 | 185 | 150 |
| 300% Modulus Kg/cm² | 125 | 120 | 110 |
| Elongation % | 475 | 420 | 390 |

What is claimed is:

1. A blend having improved properties comprising from about 98 to about 50 parts by weight of a trans-1,4 polymer of a $C_4$–$C_5$ conjugated diolefinic compound and from about 2 to about 50 parts by weight of a poly(epsilon-caprolactone), said trans-1,4 polymer being selected from a trans-1,4 polymer of butadiene or isoprene in which the trans-1,4 content is at least about 75%, and said poly(epsilon-caprolactone) contains repeat units of the structure

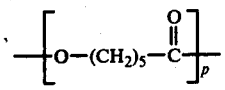

where p is at least 100 but not more than 3,000.

2. The blend of claim 1 wherein the trans-1,4 polymer is trans-1,4-polyisoprene containing at least 85% trans-1,4 units and having an X-ray diffraction crystallinity of at least 10%.

3. The blend of claim 1 which comprises from about 85 to about 60 parts by weight of the trans-1,4 polymer and from about 15 to about 40 parts by weight of poly(epsilon-caprolactone) and from about 10 to about 30 parts by weight per 100 parts by weight of the polymer blend of at least one fine particle size inorganic filler.

4. The blend of claim 2 which comprises from about 85 to about 60 parts by weight of trans-1,4-polyisoprene and from about 15 to about 40 parts by weight of poly(epsilon-caprolactone) and from about 10 to about 30 parts by weight per 100 parts by weight of the polymer blend of at least one fine particle size filler, the particle size being about 0.25 microns or less and the filler being selected from silica, titanium dioxide, diatomaceous earth or mixtures thereof.

5. The blend of claim 4 wherein the filler is a mixture of silica and titanium dioxide and is present as 20 to 30 parts by weight per 100 parts by weight of polymer blend.

6. The blend of claim 2, suitable for use as a golf ball cover, wherein the trans-1,4-polyisoprene is present at from about 80 to about 65 parts by weight and the poly(epsilon-caprolactone) is present at from about 20 to about 35 parts by weight, and the polymeric blend has a melt flow index at 100° C. under a load of 10 kg of about 0.75 to about 2.0 g per 10 minutes.

* * * * *